Dec. 14, 1948.  K. A. DUERK  2,456,114
CONDENSER STRUCTURE
Filed July 20, 1945  2 Sheets-Sheet 1

INVENTOR.
Karl A. Duerk.
BY Bair & Freeman
Attys.

Dec. 14, 1948.  K. A. DUERK  2,456,114
CONDENSER STRUCTURE

Filed July 20, 1945  2 Sheets-Sheet 2

INVENTOR.
Karl A. Duerk.
BY Bair & Freeman
Attys.

Patented Dec. 14, 1948

2,456,114

UNITED STATES PATENT OFFICE 2,456,114

CONDENSER STRUCTURE

Karl A. Duerk, Defiance, Ohio, assignor to The American Steel Package Company, Defiance, Ohio, a corporation of Ohio Application July 20, 1945, Serial No. 606,189

2 Claims. (Cl. 175—41.5)

My present invention relates to a condenser structure wherein the stator plates are supported in a novel manner with respect to the frame of the condenser.

One object of the invention is to provide a support which is an improvement over that shown in Behringer Patent No. 2,264,502, issued December 2, 1941, the present invention relating specifically to supporting brackets for the stator plates.

Another object is to provide a supporting bracket arrangement which is simple and inexpensive to manufacture, the bracket being in the form of a combined stator plate support and terminal for connection of a circuit wire thereto.

A further object is to provide a bracket which is also adaptable for having combined therewith a few simple parts to form a trimmer condenser.

Still a further object is to provide a supporting bracket so arranged that it is equally effective on the regulation type of stator plate arrangement and on a split stator type.

An additional object is to provide a supporting bracket for stator plates which may be connected to the plates by a drop of solder after the bracket is attached to the frame of the condenser and the stator plates are accurately aligned in the frame by means of a holding jig, the soldered connection thereafter serving as a support for the stator plates relative to the supporting bracket and holding the plates rigidly in their proper position regardless of irregularities of manufacture, such as in the shape of the bracket or in the securing of them to the frame as by riveting to a ceramic or similar insert held in the frame.

With these and other objects in view, my invention consists in the construction, arrangement and combination of the various parts of my device whereby the objects contemplated are attained as hereinafter more fully set forth, pointed out in my claims, and illustrated in the accompanying drawings, in which:

Fig. 1 is an enlarged side elevation of a condenser structure embodying my invention, the frame and stator being shown in solid lines and the rotor in dotted lines;

Fig. 1ᵃ is an enlarged sectional view on the line 1ᵃ—1ᵃ of Fig. 1.

Figure 1:
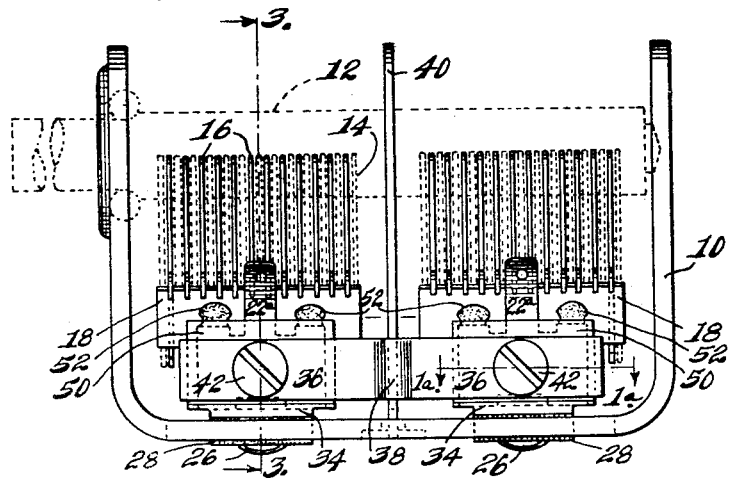

On the accompanying drawings I have used the reference numeral 10 to indicate a stator frame. This frame is of the usual U shape, having means to journal a rotor shaft 12 with its rotor plates 14 which are shown in dotted lines in Fig. 1. The present invention does not contemplate any improvement in the rotor of the condenser and further specific reference thereto will accordingly not be made.

Stator plates 16 are provided and two sets of these plates are shown in Fig. 1 interleaving with rotor plates 14, as well known in the art. The stator plates 16 are rigidly held in properly spaced parallel relation to each other by supporting plates 18 which have notched engagement with the stator plates, as disclosed in the co-pending application of Grover F. Behringer, Serial No. 538,085, filed May 30, 1944.

My present invention contemplates the support of the supporting plates 18 in insulated relation to the frame 10, and I accomplish this in the following described manner.

A bracket B is stamped of sheet metal having a horizontal portion 20, a perforated terminal portion 22, and a supporting portion 24. The bracket B is secured as by a rivet 26 to an insulation insert 28 of ceramic or the like, which insert is mounted in a hole 30 of the frame 10 and retained in the hole by a series of circumferentially spaced indentations 32 made in the frame adjacent the hole after the ceramic 28 is inserted. The ceramic insert substantially fits the hole and when the indentations 32 are made, the metal of the frame 10 is crowded toward the insert to thereafter rigidly hold it in position against subsequent displacement. Originally the bracket portion 24 is formed as shown in dotted lines in Fig. 3, while the bracket B is riveted to the insert 28, it being thereafter bent to the full line position.

Figure 3:
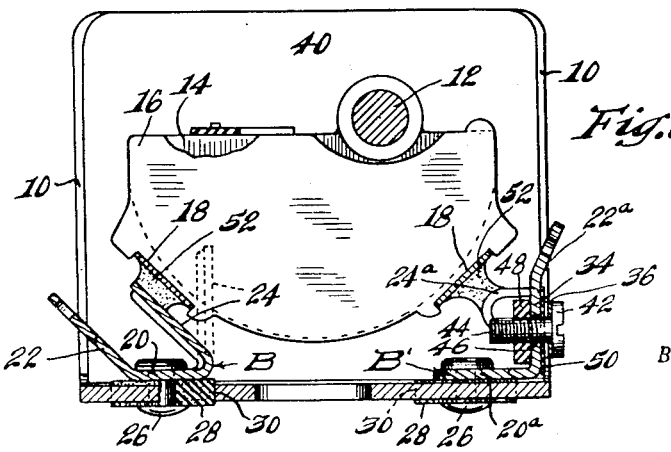
Fig. 3 is a sectional view on the line 3—3 of Fig. 1, showing the stator plates mounted in their proper position on the brackets and thereby held rigidly in the frame of the condenser.

Thus far I have described the bracket in Fig. 3 for supporting the left supporting plate 18. A somewhat similar bracket B' is provided for supporting the righthand supporting plate 18. The bracket B' differs in that it has a horizontal portion 20ᵃ secured to the ceramic insert 28 by the rivet 26, a vertical portion 34, a hook portion 24ᵃ, and a perforated terminal portion 22ᵃ. The terminal portion 22ᵃ, unlike the portion 22, forms a continuation of the vertical portion 34.

Figure 2:
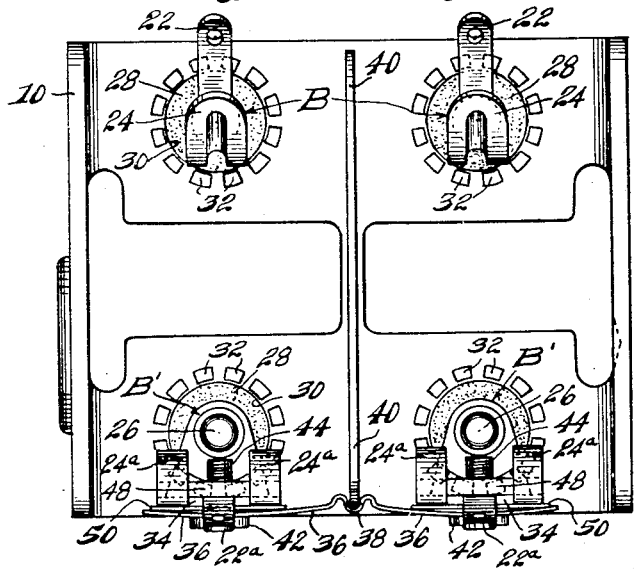
Fig. 2 is a plan view of the frame of Fig. 1 with my improved supporting brackets mounted therein.
Figure 1A:
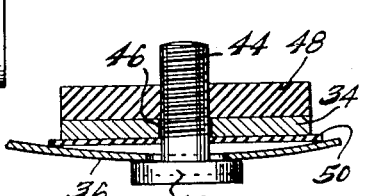

The vertical portion 34 is for the purpose of forming one plate of a trimmer condenser, the other of which comprises a leaf spring 36 having a corrugated portion 38 engaging a dividing frame plate 40 of the frame 10, as shown in Fig. 2. The ends of the leaf spring 36 extend under the heads 42 of screws 44, which screws pass through openings 46 of the vertical bracket portions 34 and are threaded into bars 48 which are formed of insulating material to prevent short circuiting the trimmer condenser. On the other hand a screw of plastic or insulating material may be used to accomplish this same result. Interposed between the adjustable trimmer condenser plate 36 and the stationary plate 34 is a sheet 50 of insulation such as mica or the like. The plate 36, it will be noted, is curved (see Fig. 1ᵃ) and may be drawn closer to the plate 34 for increasing the capacity by turning the screw 44 inwardly with respect to the bar 48.

The brackets B and B' have supporting plates 18 connected thereto by drops of solder 52. The assembly of supporting plates 18 and stator plates 16 is first rigidly held by a jig in the proper position in the frame 10 and then the solder 52 is applied as in the Behringer patent hereinbefore mentioned. My arrangement permits of the use of brackets B and B' which may be inexpensively stamped from sheet metal, and which are so shaped that the terminals 22 and 22ᵃ are located in a desired position with respect to the frame 10 which is handy for soldering circuit wires thereto. Also, the particular shape of the bracket B' permits of its use as a portion of a trimmer condenser in a very efficient manner.

Figure 4:
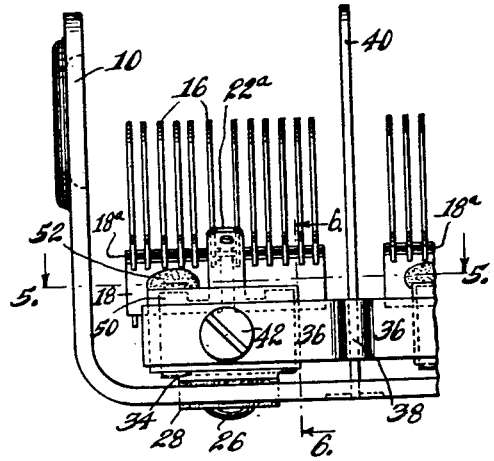
Fig. 4 is a partial side elevation of a modification wherein a split stator is supported by the supporting brackets.

The bracket B' is also designed for support of a split stator in a manner which will now be described. For this purpose the bracket B' has preferably two or more of the portions 24ᵃ which are bent to a position where they keep the bar 48 in its proper position against the vertical portion of the bracket. In order to make a split stator inexpensively the same frame 10 can be used and one or more of the stators split, as shown in Figs. 4 and 5.

Figure 5:
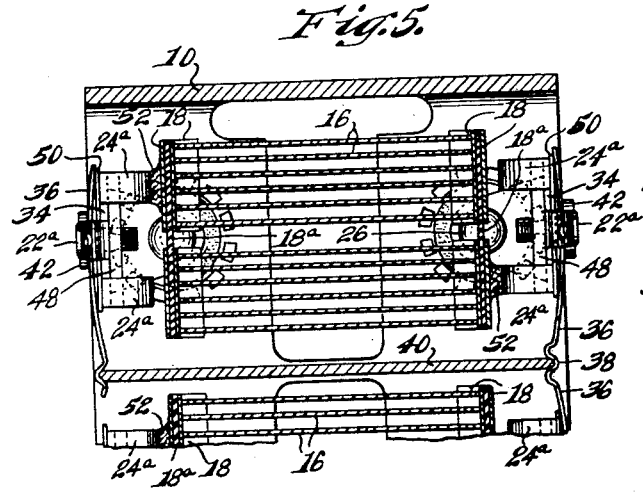
Fig. 5 is a sectional view on the line 5—5 of Fig. 4.

In a split stator the two sections of the stator must be insulated from each other and this is accomplished by a double arrangement of the supporting bars 18, as shown in Fig. 5, with a supporting strip 18ᵃ of insulation between them and serving to support the two sections of the stator with respect to each other, and at the same time insulate them from each other. The arrangement of two plates 18 and the insulating plate 18ᵃ are also fully disclosed in the Behringer application above referred to.

The present invention contemplates the use of two of the brackets B' rather than a bracket B and a bracket B' so that one portion 24ᵃ of one of the brackets may be soldered as at 52 to a supporting plate 18 of one of the split stator sections, and the diagonally opposite portion 24ᵃ of the other bracket may be soldered to a supporting plate 18 of the other section of the stator, as shown in Fig. 5. Thus there is full support for both sections of the split stator and at the same time electrical isolation of one from the other. The bracket B' is thus readily adaptable for providing a split stator arrangement where such is desirable.

Figure 6:
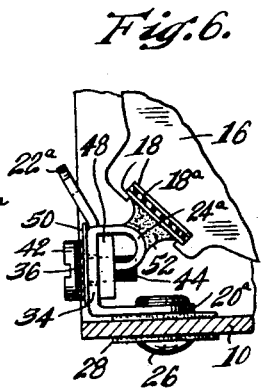
Fig. 6 is a sectional view on the line 6—6 of Fig. 4.

My bracket arrangement also provides, in Figs. 1, 2 and 3, a terminal connection 22 at one side of the frame or a terminal connection 22ᵃ at the other side for convenience in wiring. In the Figs. 4, 5 and 6 form of the invention one of the brackets B' serves as a terminal connection for one of the split stator sections and the other bracket B' for the other section. In all cases the stator plates are insulated with respect to the frame 10 by the ceramic inserts 28 and the rotor plates 14 are grounded to the frame 10 for providing a common circuit to all the condenser stators in the usual manner.

Some changes may be made in the construction and arrangement of the parts of my condenser without departing from the real spirit and purpose of my invention, and it is my intention to cover by my claims such modified forms of structure or use of mechanical equivalents as may be reasonably included within their scope.

I claim:

1. Means for mounting the stator assembly of a condenser in a frame, which stator assembly includes a supporting plate, comprising an insulating insert in said frame, a bracket secured thereto, said bracket having a portion adapted to form the stationary plate of a trimmer condenser and a supporting portion soldered to said supporting plate, a threaded element adjacent said bracket, a movable trimmer plate for movement toward and away from said stationary trimmer plate, and an adjusting screw for said movable plate, said adjusting screw being threaded into said element, said supporting portion of said bracket being bent to retain said element in position against said bracket.

2. Means for mounting the stator assembly of a variable condenser including a split stator, in a frame, comprising a pair of brackets secured to and insulated with relation to said frame, said split stator unit having supporting plates for each stator section connected with the stator plates, and insulation plates extending from the supporting plates of one split stator section to the supporting plates of the other split stator section to support one section in relation to the other, a supporting plate of one split stator section being soldered to one of said brackets, and a supporting plate of the other stator section being soldered to the other bracket, one of said brackets constituting a stationary plate of a trimmer condenser for one of said split stator sections and the other of said brackets constituting a stationary plate of a trimmer condenser for the other of said split stator sections.

KARL A. DUERK.

REFERENCES CITED

The following references are of record in the file of this patent:

UNITED STATES PATENTS

| Number    | Name       | Date           |
|-----------|------------|----------------|
| 1,934,907 | Behringer  | Nov. 14, 1933  |
| 2,010,584 | Cramer     | Aug. 6, 1935   |
| 2,046,994 | Antonietta | July 7, 1936   |
| 2,101,985 | Cramer     | Dec. 14, 1937  |
| 2,172,725 | Antonietta | Sept. 12, 1939 |
| 2,264,502 | Behringer  | Dec. 2, 1941   |

FOREIGN PATENTS

| Number  | Country       | Date           |
|---------|---------------|----------------|
| 480,200 | Great Britain | Feb. 18, 1938  |